United States Patent [19]

Tobing

[11] Patent Number: 5,262,479
[45] Date of Patent: Nov. 16, 1993

[54] PLASTICIZER RESISANT HOT MELT PRESSURE SENSITIVE ADHESIVE

[75] Inventor: Singa D. Tobing, Hillsborough, N.J.

[73] Assignee: National Starch and Chemical Investment Holding Corporation, Wilmington, Del.

[21] Appl. No.: 980,885

[22] Filed: Nov. 24, 1992

[51] Int. Cl.$^5$ .................... C09J 151/04; C09J 153/02; C08L 51/04

[52] U.S. Cl. ......................................... 525/71; 525/64; 525/70; 525/84; 525/85; 525/95; 525/99; 525/191; 525/193; 525/302; 525/306; 525/307; 525/308; 525/309; 525/310; 525/902; 526/935; 524/504; 524/505; 523/201

[58] Field of Search .................... 525/71, 902, 301, 70, 525/76, 193, 302, 306-310

[56] References Cited

U.S. PATENT DOCUMENTS

| | | | |
|---|---|---|---|
| 3,985,703 | 10/1976 | Ferry et al. | 525/82 |
| 4,028,292 | 6/1977 | Korpman | 525/92 |
| 4,133,731 | 1/1979 | Hansen et al. | 204/159.17 |
| 4,544,677 | 10/1985 | Allen et al. | 521/91 |
| 4,822,676 | 4/1989 | Mudge | 428/343 |
| 4,942,201 | 7/1990 | Briggs et al. | 525/71 |
| 4,961,993 | 10/1990 | Mudge | 428/343 |
| 4,997,884 | 3/1991 | Ilenda et al. | 525/71 |
| 5,030,538 | 7/1991 | Tobias et al. | 430/138 |
| 5,039,744 | 8/1991 | Golder | 525/92 |
| 5,063,106 | 11/1991 | Nieuwenhuize et al. | 428/343 |
| 5,079,047 | 1/1992 | Bogaert et al. | 428/41 |
| 5,109,066 | 4/1992 | Ilenda et al. | 525/71 |

FOREIGN PATENT DOCUMENTS 64-4681 1/1989 Japan .

OTHER PUBLICATIONS

Graziano, L. C. and Sjöstrand, "Development of Acrylic Latex Pressure Sensitive Adhesive for Plasticized PVC Films", *Journal of Plastic Film & Sheeting*, vol. 2-Apr. 1986, pp. 95-110.

Technical Bulletin, "Pellet Grade Summary", Paraloid®EXL®.

"Effect of Plasticizer Migration", SATAS, Handbook of PSA, 2nd Edition, 1989, pp. 429-430.

"Urethane Reactive Hot Melts", Davis, Irwin J., Presented at Adhesives & Sealants Council Meeting, Philadelphia, Pa., Apr. 1, 1987, National Starch and Chemical Corporation.

Primary Examiner—James J. Seidleck
Assistant Examiner—M. L. Warzel
Attorney, Agent, or Firm—Ellen T. Dec

[57] ABSTRACT

Improved plasticizer resistant pressure sensitive hot melt adhesive compositions are prepared by incorporating in the adhesive polymer, tackifying resin and oil 5 to 70% by weight of the adhesive of a core shell modifier comprising a crosslinked rubbery core and a glassy thermoplastic polymer shell, the core being crosslinked by the presence therein of up to 5% by weight of a polyunsaturated monomer having two or more non-conjugated sites of unsaturation of unequal reactivity.

12 Claims, No Drawings

PLASTICIZER RESISTANT HOT MELT PRESSURE SENSITIVE ADHESIVE

BACKGROUND OF THE INVENTION

Pressure sensitive adhesives are a class of materials that adhere to a variety of solid surfaces upon light application of pressure. Pressure sensitive adhesives are used in many applications such as paper labels, graphics, tapes, medical bandages and, increasingly, for plasticized vinyl. For plasticized vinyl, the pressure sensitive adhesive must be able to retain its adhesive and cohesive properties over an extended period of time both at room and elevated temperatures. However, in practice, the migration of monomeric plasticizer causes deterioration of the pressure sensitive adhesive properties by making it sticky and gummy, i.e., loss of cohesive strength, or by creating a slick plasticizer film that causes interfacial adhesion failure.

Several approaches have been reported in the literatures to improve the plasticizer resistance of pressure sensitive adhesives. The majority of the literature concentrates on solution and water borne adhesives for vinyl applications. One method to improve plasticizer resistance of pressure sensitive adhesives is by partial crosslinking. UV cured solution acrylics have been shown to improve plasticizer resistance, e.g., Bogaert et al., U.S. Pat. No. 5,079,047. Water borne adhesives made by emulsion polymerization of ethylene vinyl acetate and acrylics have also been shown to improve plasticizer resistance, e.g., Mudge, U.S. Pat. No. 4,961,933; Iovine, U.S. Pat. No. 4,822,676; and Graziano et al., J. Plastic Film and Sheeting, 2, 95 (1986). Heat cured natural rubber solution adhesive used for high temperature masking tape application also show good plasticizer resistance.

These prior art methods are generally not practical for use with conventional hot melt thermoplastic adhesives. Hot melt adhesives are 100% solid adhesives that usually coated onto a substrate in a low viscosity molten form ($<$100,000 cps and at 350° F.) using hot melt coating equipments such as roller coater, slot die, gravure, etc. They are different from a calendared coated product or skimmed or frictional product commonly practiced in rubber and plastics industry. The plasticizer resistance of hot melt adhesives, has been improved by radiation curing of styrenic block copolymers as disclosed in Hansen et al., U.S. Pat. No. 4,133,731, or moisture curing of urethane reactive hot melts as taught by Davis, in "Urethane Reactive Hot Melts", a paper presented at the Adhesives and Sealants Council Meeting, Philadelphia, Pa., Apr. 1, 1987. These methods, however, require special equipment and are very expensive to carry out. Because of their high cost and environmental/health effects, these prior art methods have generally been practiced in house by the captive manufacturers. Moreover, prior art methods for in situ curing of the adhesive during mixing/preparation lead to poor heat stability or gelling, e.g., Korpman, U.S. Pat. No. 4,028,292.

It is the object of this invention to provide a 100% solid thermoplastic hot melt adhesive with improved plasticizer resistance without the necessity of post curing step.

SUMMARY OF THE INVENTION

I have now discovered that a specific class of core-shell modifiers comprising a crosslinked rubbery polymer core and a glassy thermoplastic polymer shell can be used to modify standard hot melt pressure sensitive adhesive compositions so as to improve their plasticizer resistance. It is postulated that the crosslinked rubbery core acts as a plasticizer absorber which helps retain the cohesive strength of the adhesive while the glassy thermoplastic shell acts as a suspender or stabilizer in the melt to prevent it from agglomerating.

In addition to improving the plasticizer resistance, the use of the core-shell modifiers as disclosed herein has also been found to substantially improve the resistance of the adhesives to bleeding caused by substrates which commonly use oils or oil-containing coatings.

The use of core-shell interpolymers to control antiblock properties of adhesives has been described by Kagota et al., Japanese Patent 64-4681. However, in Kagota the core-shell interpolymer consists of a linear rubbery core and a glassy thermoplastic shell. The adhesive is coated as a latex, dried and becomes tacky when it is heated (50° C.). In such a case, the presence of a glassy thermoplastic shell improves the antiblock properties of the adhesive compared with similar compositions made of blends of rubbery and glassy thermoplastic lattices; however, the composition is not plasticizer resistant because the latex used is not crosslinked. Moreover, it does not retain its antiblock properties once heated beyond the Tg of the glassy shell (such as in hot melt) because diffusion takes place and destroys its original structure.

In contrast to Kagota, the core-shell modifiers used in the present invention typically consist of a rubbery crosslinked core and a glassy thermoplastic shell. They can have two or more layers of different polymers or copolymers intended for different applications such as impact modification, optical clarity, etc.

The monomers used in the first or core stage rubbery latex polymer are preferably n-butyl acrylate, butadiene or mixtures thereof, but may also comprise other lower alkyl acrylate monomers such as ethyl, isobutyl, 2-ethylhexyl, or mixtures thereof. The rubbery core polymer optionally contains up to 20% by weight of other monounsaturated or conjugated dienic copolymerized monomers, such as styrene, vinyl acetate, vinyl chloride, methyl methacrylate, isoprene, and the like and optionally up to 5% of a crosslinking polyunsaturated monomer having two or more non-conjugated sites of unsaturation of unequal reactivity, such as diallyl maleate, monoallyl fumarate, allyl methacrylate, and the like.

The shell stage, which is optionally chemically grafted to the core rubbery stage, is preferably polymerized from methyl methacrylate, functionalized imide oligomers or copolymers thereof or alternatively the methyl methacrylate and/or imides are copolymerized with up to 20% of other lower alkyl methacrylates such as ethyl or t-butyl or mixtures of lower alkyl methacrylates. Further, up to 40% by weight based on total shell stage monomers can be other monovinylidene monomers, such as styrene, acrylonitrile, vinyl acetate, and vinyl chloride, and the like.

In general the ratio between the core and shell will vary from about 2:1 to about 9.5:1. Preferred core-shell modifiers comprise butyl acrylate or styrene-butadiene core and a methyl methacrylate shell in a ratio of 9:1. Examples of commercial core-shell modifiers are Paraloid ® EXL series manufactured by Rohm & Haas and Kane Ace ® manufactured by Kaneka, Tex.

The core-shell modifier is added into a conventional hot melt pressure sensitive adhesive formulation in an amount of about 5 to 70, preferably 30 to 50%, by weight of the total polymer content. Examples of conventional pressure sensitive adhesive formulations to which the modifier may be added are thermoplastic polymers or blends thereof, such as ethylene vinyl acetate copolymers containing more than about 15% vinyl acetate; ethylene-n-butyl acrylate copolymers and the like. Preferably the adhesive polymer is a block copolymer having the general configuration:

A—B—A wherein the polymer blocks A are non-elastomeric polymer blocks which, as homopolymers have glass transition temperatures above 20° C., while the center elastomeric polymer blocks are derived from at least one conjugated diene such as butadiene or isoprene. These mid-blocks may, if desired, be partially or substantially hydrogenated. Further, they may be linear or branched. Styrene butadiene styrene, styrene isoprene styrene or styrene-ethylene butylene styrene are the most commonly employed block copolymers.

The adhesive compositions may also contain tackifying resins, waxes, plasticizers, antioxidants, and the like as are typically present in hot melt adhesive compositions.

While the specific tackifier chosen will vary depending on the adhesive base polymer, suitable tackifying resins include natural and modified rosins, glycerol and pentaerythritol esters of natural and modified rosins, such as polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; hydrogenated polyterpene resins; chlorinated terphenyl resins containing from about 42 to 60% by weight, of chlorine; phenolic-modified terpene resins; aliphatic petroleum hydrocarbon resins having a Ball and Ring softening point of from about 70° to 135° C.; the latter resins resulting from the polymerization of monomers consisting of primarily of olefins and diolefins; hydrogenated aliphatic petroleum hydrocarbon resins; aromatic petroleum hydrocarbon resins and the hydrogenated derivatives thereof; and alicyclic petroleum hydrocarbon resins and the hydrogenated derivatives thereof. Mixtures of two or more of the above described tackifying resins may be required for some formulations.

These pressure sensitive hot melt adhesives also require the presence of at least one plasticizing or extending oil. This term broadly encompasses not only the usual plasticizing oils for rubbers prepared from petroleum fractions but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more particularly, less than 15% by weight of the oil). The oil may be totally non-aromatic. Preferably the petroleum oils contain between about 30 and 45% naphthenic carbon atoms, between 35 and 65% by weight of paraffinic carbon atoms, the balance being aromatic carbon atoms and have number average molecular weights between about 300 and 1,400. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Other applications conventionally require the use of wax diluents in order to reduce the melt viscosity of cohesive characteristics of the hot melt viscosity or cohesive characteristics of the hot melt adhesive compositions without appreciably decreasing their adhesive binding characteristics. These waxes are typically used in adhesives which do not exhibit pressure sensitive properties. Among the applicable wax diluents are included: (1) low molecular weight, e.g., 1000–6000, polyethylene having a hardness value, as determined by ASTM method D-1321, of from about 0.1° to 120° F.; (2) petroleum waxes such as paraffin wax having a melting point of from about 130° to 165° F. and microcrystalline wax having a melting point of from about 140° to 200° F.; the latter melting points being determined by ASTM method D127-60; (3) atactic polypropylene having a Ball and Ring softening point of from about 120° to 160° C.; and synthetic waxes made by polymerizing carbon monoxide and hydrogen such as Fischer-Tropsch wax. Each of these wax diluents is solid at room temperatures. Hydrogenated animal, fish and vegetable fats and oils such as hydrogenated tallow, lard, soya oil, cottonseed oil, castor oil, menhaden oil, cod liver oil, etc., are solid materials at ambient temperature by virtue of their being hydrogenated and are also found to be useful to function as the wax diluent equivalent. These hydrogenated materials are often referred to in the adhesive industry as "animal or vegetable waxes."

In general, the hot melt adhesives are formulated so that the total polymer (i.e., core shell modifier plus the adhesive base) content is between 20 and 50%, the total tackifying resins content between 35 and 60%, the oil content between 10 and 25% and the wax content between 0 and 5%. Additionally, conventional antioxidants (stabilizers) may be utilized herein. Suitable antioxidants include high molecular weight hindered phenols and multifunctional phenols such as sulfur and phosphorus-containing phenols as are known in the art.

In order to ensure a good dispersion, the core-shell modifier should be well dispersed into the matrix polymer prior to addition of the resins and plasticizers. Normally, this is done using a high shear (heated) mixing equipment such as internal mixer, two roll mills, or twin screw extruder, but optionally, solvent could be used to aid dispersion.

The exact pressure sensitive adhesive composition will vary depending on the specific end use requirements such as the level and type of plasticizer in the vinyl substrate, thickness of the substrate, thickness of adhesive, type of backing and application temperature. These factors determine the severity of plasticization of the pressure sensitive adhesive. While it is necessary to design a pressure sensitive adhesive with superior plasticizer resistance, it must also be balanced with good tack, peel and shear strength. The skilled practitioner will be able to develop his own pressure sensitive adhesive product for his specific application following the illustrations given below and the concept mentioned previously.

EXAMPLES

In the examples given below, the object is to develop a pressure sensitive adhesive composition with superior plasticizer resistance than the control product while simultaneously having good lap shear strength. Such a pressure sensitive adhesive has commercial value in a variety of applications, including sanding disc applications, where the adhesive is used to bond sandpaper to a vinyl buffing pad and where the pressure sensitive adhesive must be removable after the buffing operation without leaving residues on the substrate. These vinyl pads (~25 mil thick) typically contain about 30% monomeric ester type plasticizer. Using conventional adhesives, a liquid-like sticky residue caused by plasticizer migration from the vinyl substrate and accelerated by elevated temperature condition during buffing, destroys the cohesive strength of the pressure sensitive adhesive.

EXAMPLES 1-11

A series of pressure sensitive adhesives were prepared and tested as follows. The compositions of the particular samples are identified in Table 1.

In general, the preparation of these pressure sensitive adhesive compositions involves two steps. First, a master batch was prepared by mixing the core shell modifier and the styrene-ethylene-butylene-styrene block polymer in a 60 cc Brabender Plasticorder using roller blades at 175° C. and 50 rpm for 12 minutes or until the stock temperature and torque have reached a steady value. The master batch was then mixed with the resins, oil, wax and antioxidants in various proportions as in shown in Table 1 using a sigma mixer at 170° C. for approximately 20 minutes.

TABLE 1

| | Pressure Sensitive Adhesive Compositions | | | | | | | | | | |
|---|---|---|---|---|---|---|---|---|---|---|---|
| Materials | 1 | 2 | 3 | 4 | 5 | 6 | 7 | 8 | 9 | 10 | 11 |
| Paraloid EXL-2300 | 16 | 8 | 6.4 | 16 | 8 | 16 | 14.8 | 11.6 | 5.8 | 8 | 11.23 |
| Kraton G-1657 | 24 | 32 | 25.6 | 24 | 32 | 24 | 22.2 | 17.4 | 23.2 | 32 | 26.21 |
| Arkon P-90 | 50 | 37.5 | 50 | 31.5 | 47 | 40 | 37.5 | 50 | 37.5 | 35 | 39.76 |
| Foral 85 | 0 | 12.5 | 0 | 10.5 | 0 | 0 | 12.5 | 0 | 12.5 | 5 | 5.68 |
| Shellflex 371 N | 10 | 10 | 18 | 18 | 10 | 17 | 10.0 | 18 | 18.0 | 17 | 15.22 |
| Paraflint wax | 0 | 0 | 0 | 0 | 3 | 3 | 3 | 3 | 3 | 3 | 1.9 |
| Irganox 1010 | 0.25 | 0.25 | 0.25 | 0.25 | 0.25 | 0.25 | 0.25 | 0.25 | 0.25 | 0.25 | 0.25 |
| Santovar A | 0.25 | 0.25 | 0.25 | 0.25 | 0.25 | 0.25 | 0.25 | 0.25 | 0.25 | 0.25 | 0.25 |

Paraloid ® EXL-2300 a butyl acrylate/methyl methacrylate core-shell polymer from Rohm & Haas
Kraton ® G-1657 a styrene-ethylene butylene styrene block copolymer from Shell
Arkon ® P-90 from Arakawa Chemicals
Foral ® 85 a hydrogenated rosin from Hercules
Shellflex ® 371 N a napthenic oil from Shell
Paraflint wax is a Fisher Tropsch wax from Moore and Monger
Irganox 1010 is hindered phenol antioxidant from Ciba Geigy
Santovar A is an antioxidant from Monsanto The pressure sensitive adhesive compositions were coated onto a release silicone paper by first heating them to about 190° C. and transferring them onto the rollers. Roller temperatures were about 90° C. and in order to retain the fluidity, a heat/hot air gun was directed toward the molten adhesives. The coating thickness was between 4-5 mils. For this specific application, the coating was transferred from a release paper onto the back of sandpaper by applying pressure and heat. All coatings were smooth and uniform, although the viscosity of the adhesive compositions seemed to be very high. This is an indication that the melt rheological behavior of the adhesive is highly non-Newtonian, exhibiting shear thinning with a yield value. The coated sheets were cut into 4×1 inch strips.

For the plasticizer resistance test, the strips were laminated onto a vinyl sheet about 25 mils thick and placed between two glass plates in an air oven at 140° F. for 24 hours. The strips were then removed after cooling down for about 20 minutes and rated for their cleanliness on the scale from 1 to 10 where 1 is the worst (adhesive leaves a tacky, gummy, liquid-like residue on the vinyl sheet) and 10 is the best (adhesive does not leave any residue on the vinyl sheet but still retains its adhesive character). The extent of oil bleed from the vinyl sheets and also from the adhesive itself was rated from 1 (worst) to 10 (best) by noticing the extent of oil penetration into the sandpaper.

For the lap shear test, the strips were laminated onto a vinyl strip over 1×1 inch overlaps and pulled at 12 in/min at room temperature using Instron ® machine. The maximum force was measured in pounds and it is indicated as lap shear strength. For the aged lap shear test, the laminated strips were aged in the oven between two glass plates at 140OF for three hours and pulled at RT at 12 in/min after cooling them over night at RT.

For the melt rheology study, the molten pressure sensitive adhesive's were extruded through an orifice at 300° F. using a piston pressure of 43 psi (ASTM D 1238-86). From the measured time required for the piston to travel a one inch distance, apparent viscosity and apparent shear rate can be calculated.

The results from these experiments are shown in Table 2.

TABLE 2

Performance of Pressure Sensitive Adhesive Compositions

| Composition | Plast. Res[2] | Lap Shear[1] (psi) | Aged[1] Lap Shear | Oil[3] Bleed | Apparent[4] Viscosity (cps) |
|---|---|---|---|---|---|
| Control | 1 | 17 | 11 | 5 | 48 × 10$^3$ |
| 1 | 7 | 11 | 12 | 10 | 68 × 10$^3$ |
| 2 | 8 | 8 | 11.8 | 10 | 136 × 10$^3$ |
| 3 | 2 | 13.5 | 7 | 2 | 29 × 10$^3$ |
| 4 | 8 | 11.5 | 8.8 | 8 | 68 × 10$^3$ |
| 5 | 6 | 9 | 13.6 | 10 | 68 × 10$^3$ |
| 6 | 8 | 10 | 10.4 | 10 | 48 × 10$^3$ |
| 7 | 9 | 8.5 | 11.2 | 9 | 39 × 10$^3$ |
| 8 | 5 | 11 | 6.8 | 3 | 19 × 10$^3$ |
| 9 | 3 | 11 | 6.8 | 5 | 9.6 × 10$^3$ |
| 10 | 9 | 6 | 10.4 | 10 | 96 × 10$^3$ |
| 11 | 8 | 9.5 | 8.0 | 10 | 77 × 10$^3$ |

[1] Lap Shear: pull direction is parallel to fabric backing
[2] Plast. Res: 1 - worst  10 - best
[3] Oil Blend: 1 - worst  10 - best
[4] Apparent viscosity at 300° F. and 43 psi capillary pressure It is clear that most of the pressure sensitive adhesive compositions prepared above show a better plasticizer resistance compared to the control, but the lap shear strength is still below the control. Nonetheless, these compositions would find use in certain labelling applications.

EXAMPLES 12-31

Preferred pressure sensitive adhesive compositions having excellent plasticizer resistance together with improved lap shear strength are illustrated in the following examples. The adhesives were prepared as in Examples 1-11 with the mixture components and their amounts shown in Table 3.

TABLE 3

| Materials | 12 | 13 | 14 | 15 | 16 | 17 | 18 | 19 | 20 | 21 | 22 | 23 | 24 |
| --- | --- | --- | --- | --- | --- | --- | --- | --- | --- | --- | --- | --- | --- |
| Paraloid EXL 2300 | 8 | 20 | 8 | 20 | 15 | 7 | 20 | 8 | 20 | 8 | 14 | 16.25 | 17.5 |
| Kraton G 1657 | 32 | 20 | 32 | 20 | 15 | 28 | 20 | 32 | 20 | 32 | 26 | 16.25 | 17.5 |
| Arkon P-90 | 45 | 45 | 22.5 | 22.5 | 27.5 | 55 | 50 | 25 | 25 | 47.5 | 50 | 55 | 50 |
| Foral 85 | — | — | 22.5 | 22.5 | 27.5 | — | — | 25 | 25 | — | — | — | — |
| Shellflex 371 N | 15 | 15 | 15 | 15 | 15 | 10 | 10 | 10 | 10 | 12.5 | 10 | 12.5 | 15 |
| Irganox 1010 | 0.25 | 0.25 | 0.25 | 0.25 | 0.25 | 0.25 | 0.25 | 0.25 | 0.25 | 0.25 | 0.25 | 0.25 | 0.25 |
| Santovar A | 0.25 | 0.25 | 0.25 | 0.25 | 0.25 | 0.25 | 0.25 | 0.25 | 0.25 | 0.25 | 0.25 | 0.25 | 0.25 |

| Materials | 25 | 26 | 27 | 28 | 29 | 30 | 31 |
| --- | --- | --- | --- | --- | --- | --- | --- |
| Paraloid EXL 2300 | 10.5 | 6.5 | 6 | 7 | 17.5 | 12.25 | 12.69 |
| Kraton G 1657 | 19.5 | 26 | 24 | 28 | 17.5 | 22.75 | 23.56 |
| Arkon P-90 | 55 | 27.5 | 41.25 | 25 | 41.25 | 27.5 | 38.44 |
| Foral 85 | — | 27.5 | 13.75 | 25 | 13.75 | 27.5 | 12.81 |
| Shellflex 371 N | 15 | 12.5 | 15 | 15 | 10 | 10 | 12.5 |
| Irganox 1010 | 0.25 | 0.25 | 0.25 | 0.25 | 0.25 | 0.25 | 0.25 |
| Santovar A | 0.25 | 0.25 | 0.25 | 0.25 | 0.25 | 0.25 | 0.25 |

Table 4 shows the test results of pressure sensitive adhesive compositions described in Table 3. All test procedures are the same as described previously. The only difference here is the direction of pull in lap shear test, where the pull direction is now perpendicular to the fabric backing of the vinyl substrate. This direction ensures more rigidity for the substrate and the result will be more representative of the lap shear strength of the adhesive and less influenced by the substrate. From the results shown, compositions 15, 20, 29 and 30 show a definite improvement over the control. These compositions contain high level of core-shell modifier and hydrogenated rosin ester (Foral 85). It appears that this particular core-shell modifier (acrylic type, BA/MMA, Paraloid ® EXL-2300) is more compatible with hydrogenated rosin ester and therefore increasing its level must be balanced with higher level of the compatible tackifier. It will be recognized that optimum formulations for other end uses would, of course, vary.

TABLE 4

| Composition | Plast. Res[1] | Lap Shear[2] (psi) | Aged Lap[2] Shear | Oil[3] Bleed |
| --- | --- | --- | --- | --- |
| Control | 1 | 30 | 22.5 | 5 |
| 12 | 4 | 23.5 | 40* | 7 |
| 13 | 5 | 14 | 30 | 6 |
| 14 | 6 | 12 | 25* | 10 |
| 15 | 7 | 28 | 18.5 | 8 |
| 16 | 2 | 28.5 | 14.5 | 2 |
| 17 | 5 | 22.5 | 42 | 10 |

TABLE 4-continued

| Composition | Plast. Res[1] | Lap Shear[2] (psi) | Aged Lap[2] Shear | Oil[3] Bleed |
| --- | --- | --- | --- | --- |
| 18 | 6 | 17.5 | 34.5 | 10 |
| 19 | 5 | 24 | 36.5 | 10 |
| 20 | 9 | 24 | 33 | 10 |
| 21 | 5 | 23 | 33 | 10 |
| 22 | 5 | 25.5 | 38 | 10 |
| 23 | 4 | 23.5 | 32 | 7 |
| 24 | 5 | 22 | 25 | 6 |
| 25 | 4 | 27.5 | 25 | 6 |
| 26 | 3 | 30 | 16 | 7 |
| 27 | 3 | 27 | 17.5 | 7 |
| 28 | 4 | 21 | 15.5 | 8 |
| 29 | 8 | 27 | 34.5 | 8 |
| 30 | 6 | 28 | 21 | 8 |
| 31 | 6 | 16 | 18 | 8 |

[1]Plast. Res: 1 - worst  10 - best
[2]Lap Shear: Pull direction is perpendicular to fabric backing
[3]Oil Bleed: 1 - worst  10 - best
*Paper Tear

EXAMPLE 32

Composition #16, #20, and #29 shown in Table 3 were evaluated with regard to their resistance against oil, instead of monomeric plasticizer. This was done by laminating the test strips onto a highly oil extended block copolymer of about 80 mils thick and placing the laminates between two glass plates at room temperature. After two hours, we noticed varying degrees of oil bleed among the samples. On the rating of 1 to 10 where 1 is the worst and 10 is the best, both compositions #20 and #29 showed excellent oil bleed resistance (10), while composition #16 showed lowered oil bleed resistance (2).

One skilled in the art can further improve these compositions by choosing a different type of core-shell polymer which is more effective in absorbing hydrocarbon oil and different type of matrix polymer that would resist oil penetrations as to design a system that best suits the needs of the particular system.

EXAMPLE 33

Another adhesive composition was prepared to show the effort of the core shell modifier on a styrenic isoprene styrene block copolymer.

| Composition | Amount |
| --- | --- |
| Kraton D-1107 | 21.6 |
| Paraloid EXL-2300 | 14.4 |
| Wingtac 95 | 47 |
| Shellflex 371N | 14 |
| Iraganox 1010 | 0.25 |
| Santovar A | 0.25 |
| Paraflint Wax | 2.35 |
| Acrowax C | 0.95 |
| Test Results | |
| Plasticizer resistance+: 6 | |
| Lap shear (psi)*: 12 | |
| Oil bleed ●: 7 | |

+140° F., 24 hours between two glass plates; 1-worst, 10-best
*Lap shear: pull direction is parallel to fabric backing
● Oil bleed: 1-worst, 10-best Similar results would be expected using other thermoplastic adhesive polymer bases such as ethylene vinyl acetate or styrene butadiene styrene.

We claim:

1. In a plasticizer resistant pressure sensitive hot melt adhesive consisting essentially of an adhesive polymer, tackifying resin and oil, the improvement which comprises incorporating therein of 5 to 70% by weight of the adhesive of a core shell modifier comprising a crosslinked rubbery core and a glassy thermoplastic polymer shell, the core being crosslinked by the presence therein up to 5% by weight of a polyunsaturated monomer having two or more non-conjugated sites of unsaturation of unequal reactivity.

2. The hot melt adhesive of claim 1 wherein the monomers in the rubbery core polymer are selected from the group consisting of lower alkyl acrylates, butadiene and mixtures thereof.

3. The hot melt adhesive of claim 1 wherein the rubbery core polymer contains up to 20% by weight of other monounsaturated or conjugated dienic copolymerized monomers.

4. The hot melt adhesive of claim 1 wherein the shell stage is polymerized from methyl methacrylate, functionalized imide oligomers or copolymers thereof or the methyl methacrylate and/or imides are copolymerized with up to 20% of other lower alkyl methacrylates.

5. The hot melt adhesive of claim 1 wherein the shell stage additionally contains up to 40% by weight monovinylidene monomers.

6. The hot melt adhesive of claim 5 wherein the monovinylidene monomer is selected from the group consisting of styrene, vinyl acetate, vinyl chloride and acrylonitrile.

7. The hot melt adhesive of claim 1 wherein the ratio between the core and shell will vary from about 2:1 to about 9.5:1.

8. The hot melt adhesive of claim 1 wherein the core-shell modifiers comprise butyl acrylate or styrene-butadiene core and a methyl methacrylate shell in a ratio of 9:1.

9. The hot melt adhesive of claim 1 wherein the core shell modifier is present in an amount of 30 to 50% by weight of the total polymer.

10. The hot melt adhesive of claim 9 wherein the adhesive base polymer is selected from the group consisting of ethylene vinyl acetate, ethylene-n-butyl acrylate, styrene butadiene styrene, styrene isoprene styrene and styrene-ethylene butylene styrene.

11. The hot melt adhesive of claim 10 wherein the adhesive base polymer is a styrene block copolymer.

12. A The hot melt adhesive of claim 11 wherein the block copolymer is a styrene-ethylene-butylene-styrene block copolymer.

* * * * *